United States Patent [19]

Knierim et al.

[11] Patent Number: 4,999,702
[45] Date of Patent: Mar. 12, 1991

[54] METHOD AND APPARATUS FOR PROCESSING COMPONENT SIGNALS TO PRESERVE HIGH FREQUENCY INTENSITY INFORMATION

[75] Inventors: David L. Knierim, Wilsonville; Gary L. Brown, Lake Oswego, both of Oreg.

[73] Assignee: Tektronix, Inc., Beaverton, Oreg.

[21] Appl. No.: 457,062

[22] Filed: Dec. 26, 1989

Related U.S. Application Data

[62] Division of Ser. No. 334,829, Apr. 7, 1989.

[51] Int. Cl.$^5$ .................................................. H04N 9/64
[52] U.S. Cl. .................................... 358/32; 358/31
[58] Field of Search ........................ 358/21 R, 31, 32

[56] References Cited

U.S. PATENT DOCUMENTS 1,033,413  6/1966  Martinez ........................... 358/32
3,272,916  9/1966  James et al. ........................ 358/32

OTHER PUBLICATIONS

Signal Processing for Compatible HDTV, Glenn et al, SMPTE Journal, Nov. 1989; pp. 812-816.
Experiments with an Enhanced-Quality NTSC—Compatible TV System, By Sugimori et al. SMPTE Journal, Dec. 1988 pp. 970-976.

*Primary Examiner*—James J. Groody
*Assistant Examiner*—Kim Yen Vu
*Attorney, Agent, or Firm*—John Smith-Hill

[57] ABSTRACT

A video signal in component form is processed by generating two chroma component signals which have a selected bandwidth and are GAMMA corrected, generating a linear luminance component signal which has a greater bandwidth than the chroma component signals and is not GAMMA corrected, and GAMMA correcting the linear luminance component signal to provide a GAMMA-corrected luminance component signal having a greater bandwidth than the GAMMA-corrected chroma component signals.

5 Claims, 3 Drawing Sheets ized resolution display. In an area of the field is 1 and elsewhere it is 0 and

METHOD AND APPARATUS FOR PROCESSING COMPONENT SIGNALS TO PRESERVE HIGH FREQUENCY INTENSITY INFORMATION

This is a Division of application Ser. No. 334,829 filed Apr. 7, 1989.

BACKGROUND OF THE INVENTION

This invention relates to a method and apparatus for processing component signals to preserve high frequency intensity information.

FIG. 1 shows a conventional color video camera and a conventional color cathode ray tube (CRT) display device 6. Camera 2 includes three linear sensors 4R, 4G and 4B, which generate respective color component signals R', G' and B'. The voltages of these three signals are proportional to the intensity of red, green and blue light respectively in the camera's focal plane. However, the intensity of light emitted by the screen of a conventional CRT is not linearly related to the voltage of the video signal that is applied to the electron gun of the CRT. In the case of a color CRT, the intensity of light emitted by the CRT is given by $$I = .299*(R**GAMMA) + .587*(G**GAMMA) + .114*(B**GAMMA)$$

where R, G and B are the driving voltages applied to the red, green and blue electron guns respectively, ** is the exponentiation operator and GAMMA is a constant (2.2 in the case of the NTSC system).

Because of this relationship between electron gun driving voltage and emitted light intensity, the video camera shown in FIG. 1 incorporates GAMMA correction circuits 5R, 5G and 5B, so that the red component signal R outputted by the camera is proportional to R'**(1/GAMMA), and similarly for G and B. The R, G and B color component signals provided by the camera may be used, with suitable amplification, to drive the CRT directly, as shown in dashed lines, and the intensity of red, green and blue light emitted by the CRT would be proportional to R', G' and B' respectively. However, most color television standards, such as NTSC, PAL and RP125, encode visual information as luminance (Y) and chrominance, or chroma (R-Y and B-Y), where $$Y = .299*R + .587*G + .114*B$$

Therefore, video camera 2 includes a resistive encoding matrix 8 that converts the R, G and B component signals to luminance and chroma component signals and the display device 6 includes a decoding matrix 9 that receives the Y, R-Y and B-Y signals and reconstructs the R, G and B component signals therefrom.

If R, G and B each range in value from 0 to 1, and R, G and B are each equal to 1, so that white light is emitted, Y is equal to 1 and the emitted light intensity I is equal to 1. However, because the emitted light intensity is a non-linear function of R, G and B, the luminance component, Y, is not sufficient to describe the intensity of the light emitted by the CRT. Thus, a given Y value will result in a higher intensity when combined with large chroma values (large absolute values for R-Y and/or B-Y) than when combined with small chroma values. For example, a saturated full brightness red (R=1, G=0 and B=0) has a Y value of .299 and provides an intensity value of .299, whereas a gray for which R=.299, G=.299 and B=.299 also provides a Y value of .299 but results in an intensity of .299**GAMMA, or .070 for GAMMA=2.2.

A problem with the non-linearity of the relationship between emitted intensity and R, G and B arises when the chroma component signals are filtered to a lower bandwidth than the luminance component signal. If color component signals R, G and B are used to drive a high resolution CRT display, and the value of R within a selected area of the field is 1 and elsewhere it is 0 and the values of G and B are 0 throughout the field, so that the CRT displays an area of saturated red against a black background, the peak value of Y is .299 and the peak value of I is .299. If these color component signals are converted to the NTSC standard, in which the Y component signal has a potential bandwidth of 4.2 MHz and the chroma component signals are limited to a bandwidth of 1.2 MHz, and the area of the field that is red is a vertical line that is at least as wide as allowed by the bandwidth of the chroma channels, the values of Y and I within the area of the red line are the same as in the case of the high resolution display The peak values of R-Y and B-Y are .701 and −.299 respectively. If, however, the line was as narrow as allowed by the luminance channel bandwidth, the chroma filters would spread out the chroma signals by a factor of three or so, and reduce the peak values of the chroma signals by the same factor. Accordingly, while the peak value of Y is still .299, the peak values of R-Y and B-Y are .234 and −.100 respectively, and the peak intensity is .095 for GAMMA equal to 2.2., or only about one-third of the intensity value for the wider line. This problem of reduced intensity is not limited to the case in which the signals are filtered in the horizontal direction, and arises also with vertical filtering, for example when component signals for driving a high resolution display, which may have more than a thousand lines per frame, are converted to a broadcast television standard having only about 500 or 600 lines per frame. In the case of the PAL system, in which GAMMA is equal to 2.8, the problem is even more severe.

SUMMARY OF THE INVENTION

In accordance with a first aspect of the invention, a video signal in component form is processed by generating two chroma component signals which have a selected bandwidth and are GAMMA corrected, generating a linear luminance component signal which has a greater bandwidth than the chroma component signals and is not GAMMA corrected, and GAMMA correcting the linear luminance component signal to provide a GAMMA-corrected luminance component signal having a greater bandwidth than the GAMMA-corrected chroma component signals.

The luminance component signal that is not GAMMA corrected may be generated in several different ways. For example, linear color component signals may be applied directly to a luminance matrix and through a GAMMA correction circuit to a chroma matrix. Alternatively, an approximation of the luminance component signal that is not GAMMA corrected may be generated from a luminance component signal that is GAMMA corrected by removing the GAMMA correction in the luminance domain.

In accordance with a second aspect of the invention, a video signal in GAMMA-corrected color component form and having a selected bandwidth is processed by removing the GAMMA correction to provide linear color component signals, limiting the bandwidth of the linear color component signals to a value lower than the selected bandwidth to provide bandwidth-limited color component signals, and GAMMA correcting the bandwidth-limited color component signals to provide GAMMA-corrected, bandwidth-limited color component signals.

BRIEF DESCRIPTION OF THE DRAWINGS

For a better understanding of the invention, and to show how the same may be carried into effect, reference will now be made, by way of example, to the accompanying drawings.

In the several figures, like reference numerals indicate like component.

DETAILED DESCRIPTION

Figure 2:
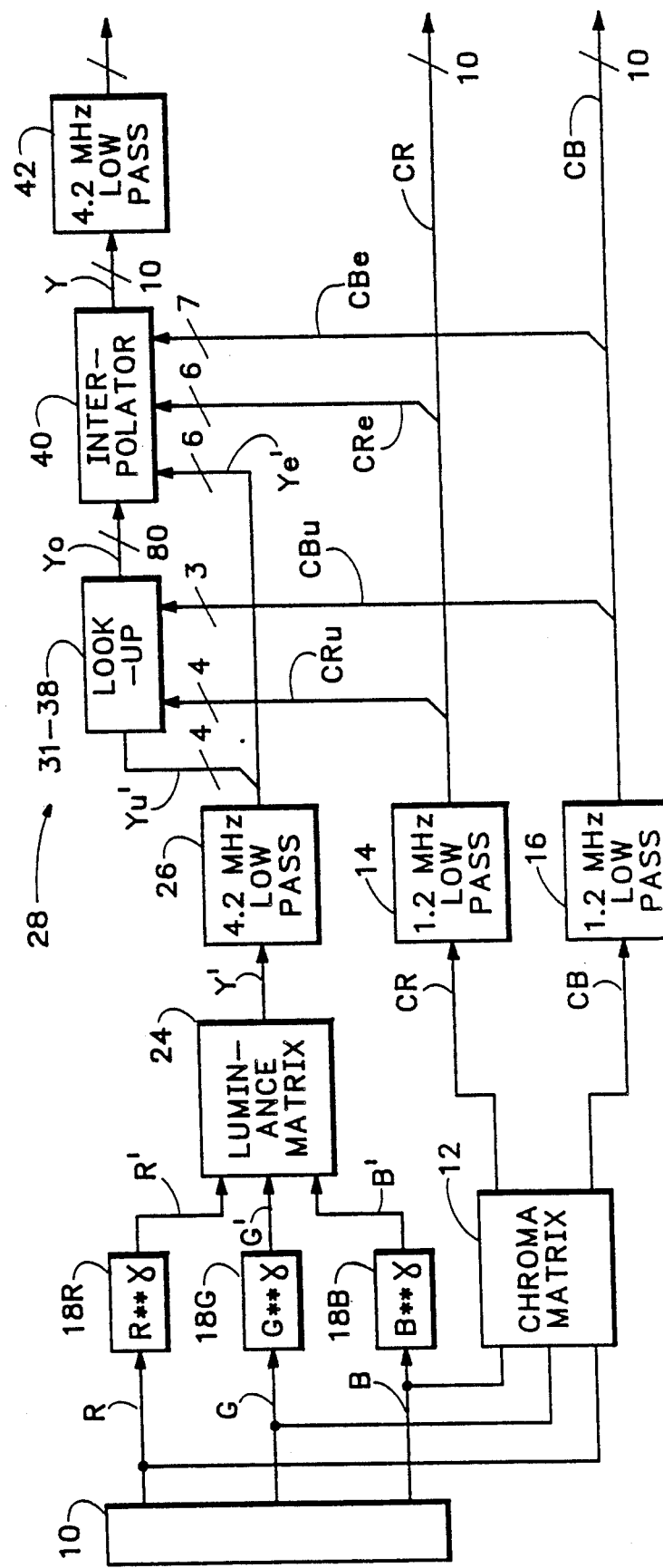
FIG. 2 is a block diagram of a first embodiment of the invention.

The apparatus shown in FIG. 2 comprises a source 10 of GAMMA-corrected color component signals R, G and B. The color component signals are digital signals in 10-bit parallel form and are all of the same bandwidth, which, in this example, is at least 4.2 MHz. Source 10 might be, for example, a video camera or a high resolution color graphics system that provides color component signals.

The color component signals provided by source 10 are applied to a conventional chroma matrix 12, which provides chroma output signals CR and CB respectively. The chroma signals are applied to respective low-pass filters 14 and 16 each having a cutoff frequency of 1.2 MHz, and therefore the chroma signals CR, CB that are output by filters 14 and 16 are limited to a bandwidth of 1.2 MHz.

The GAMMA-corrected color component signals R, G and B are also applied to GAMMA-removal circuits 18R, 18G and 18B respectively. Circuit 18R provides an output signal R' which is equal to R**2.2, and circuits 18G and 18B operate in similar fashion on the signals G and B to provide output signals G' and B'. Thus, GAMMA-removal circuits 18 remove the GAMMA corrections from the color component signals R, G and B and provide uncorrected, or linear, color component signals R', G' and B' respectively The signals R', G' and B' are applied to a luminance matrix 24 which provides a linear luminance component signal Y' defined by

Y' = .299*R' + 587*G' + 114*B'

This signal is applied to a low-pass filter 26 having a cutoff frequency of 4.2 MHz.

The output signal of filter 26 is applied to a GAMMA corrector 28. GAMMA corrector 28 comprises eight look-up tables 31–38, and an interpolator 40. The upper bits Yu', CRu and CBu of the Y', CR and CB signals respectively are used to address the look-up tables. Each look-up table has a three-dimensional (Yu', CRu, CBu) address space and contains data values for each addressable location within that address space. For a given combination of address segments (Yu', CRu and CBu), look-up table 31 returns the value of Yo such that $$Yu' = .299*(Yo + CRu)**GAMMA +$$
$$.587*(Yo - .509*CRu - .194*CBu)**GAMMA +$$
$$.114*(Yo + CBu)**GAMMA$$

is approximately true. The data values stored in look-up table 31 are slightly offset from the values indicated in order to minimize the average error due to the non-linearity of the function that relates Yo to Yu', CRu and CBu.

The other seven look-up tables 32–38 contain the same data values as table 31, but the array of data values in each of tables 32–38 is shifted with respect to the array of data values in table 31 by one LSB along one or more coordinates of the address space. For example, in response to the address (Yu', CRu, CBu) table 32 returns the value of Yo that would be returned by table 31 in response to the address (Yu'+1/16, CRu, CBu), table 33 returns the value of Yo that would be returned by table 31 in response to the address (Yu', CRu+1/16, CBu), and table 34 returns the value of Yo that would be returned by table 31 in response to the address (Yu', CRu, CBu+⅛). Therefore, in response to a given Yu', CRu, CBu triple, look-up tables 31–38 provide eight values of Yo.

The eight values of Yo provided by the look-up tables are applied to interpolator 40, which carries out trilinear interpolation among the values returned by the look-up tables, employing the lower bits Yl', CRl and CBl of the component signals Y', CR and CB as weighting coefficients. In this manner, an output value of Y is generated for each Y', R-Y, B-Y triple such that the intensity will be proportional to Y' and the intensity of high frequency color information is corrected.

It will be appreciated that there is a loss of saturation as well as intensity when the chroma component signals are filtered to a lower bandwidth than the luminance component signal, and that the loss of saturation is not corrected by the apparatus shown in FIG. 2, but it is well known that the eye is fairly insensitive to saturation errors at high spatial frequencies.

The operation of GAMMA corrector 28 may generate harmonics of the signal Y' at its Y output, and the output signal of filter 26 is applied to another 4.2 MHz low-pass filter 42 to remove these harmonics. The digital output signals of filters 14, 16 and 42 may then be converted to analog form and, assuming appropriate line and field rates, used to generate a composite NTSC signal.

Figure 3:
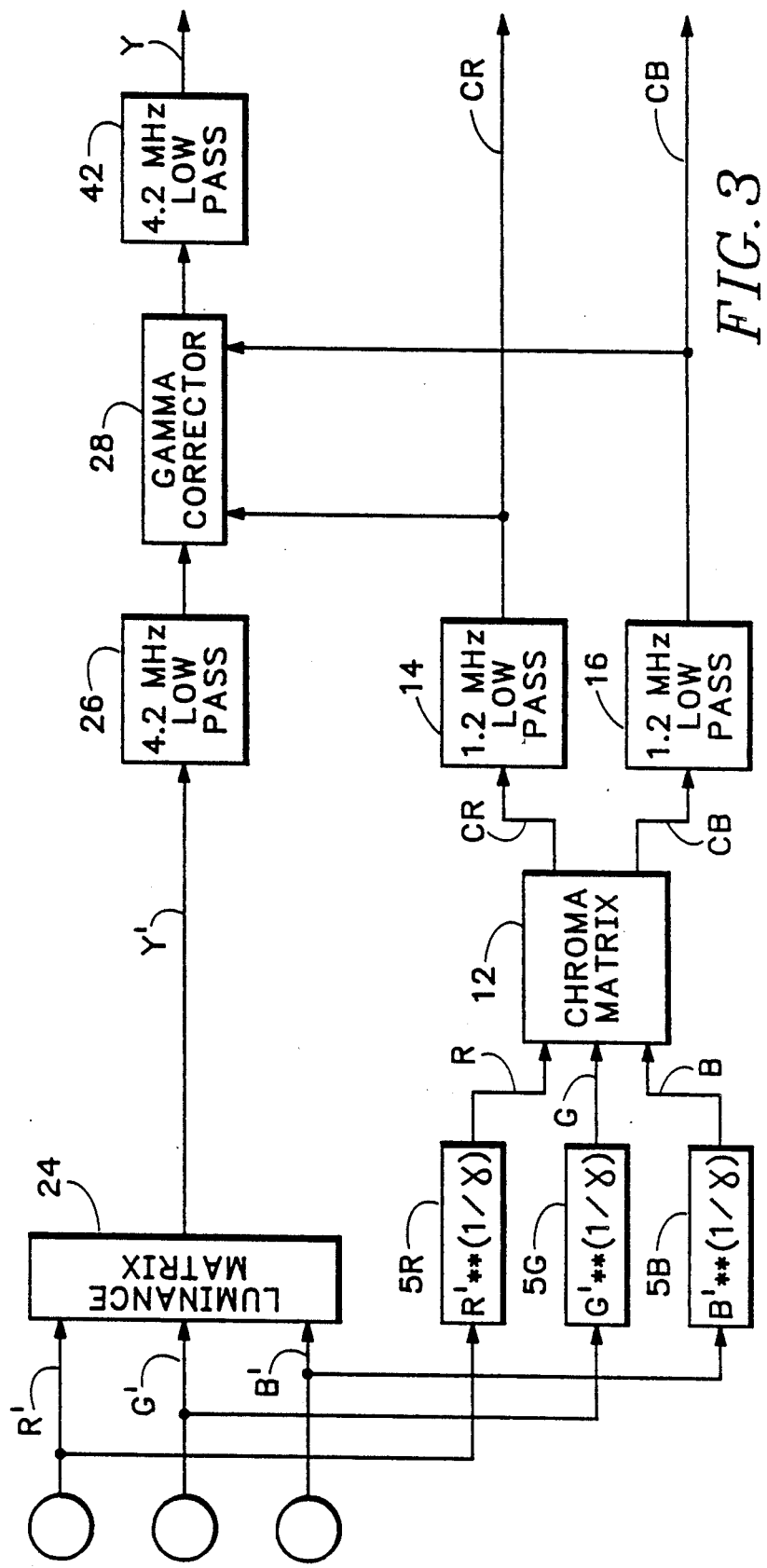
FIG. 3 is a block diagram of a second embodiment of the invention.

In the apparatus shown in FIG. 3, color component signals R', G' and B' provided by linear sensors 4 are applied to luminance matrix 24, which provides a linear luminance signal Y', and to GAMMA correction circuits 5 which provide GAMMA-corrected color component signals R, G and B respectively. The GAMMA-corrected component signals R, G and B are applied to chroma matrix 12 to provide chroma signals CR and CB. The processing of the signals Y', CR and CB proceeds in the same fashion as described with reference to FIG. 2.

Figure 1:
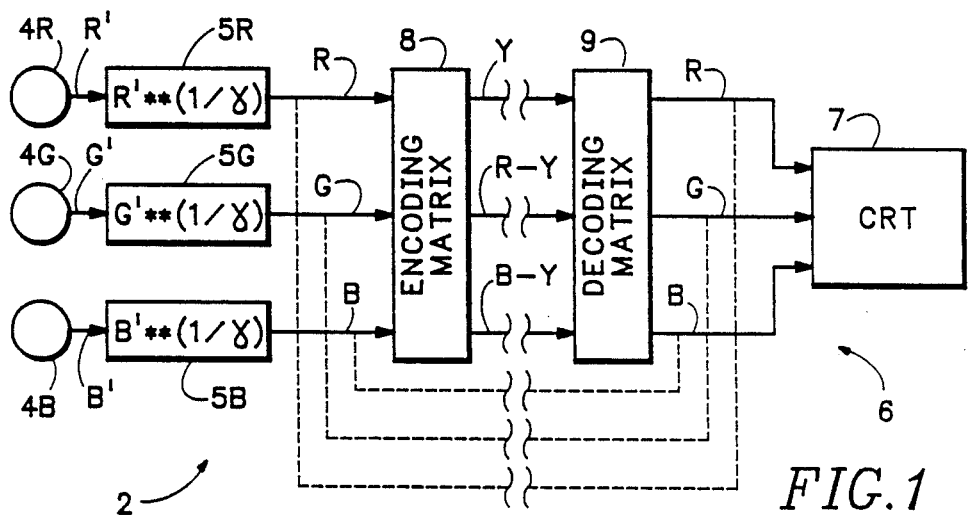
FIG. 1 is a block diagram of a conventional arrangement of a video camera and display device.
Figure 4:
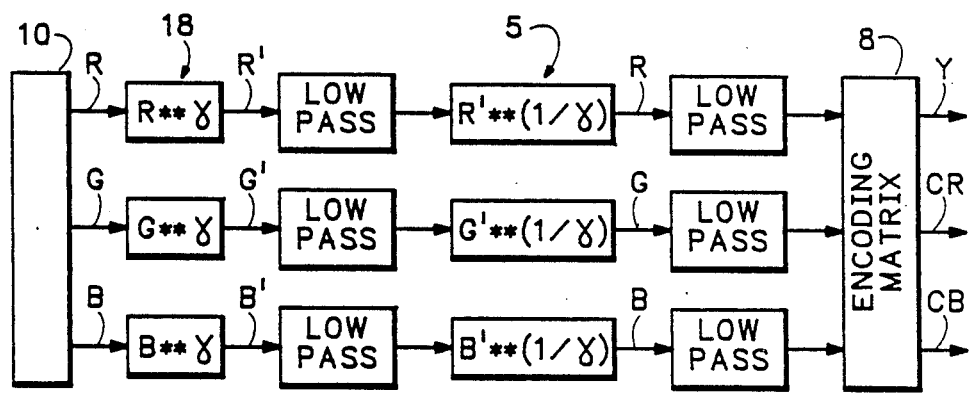
FIG. 4 is a block diagram of a third embodiment of the invention.

In the apparatus shown in FIG. 4, GAMMA-corrected color component signals R, G and B provided by source 10 are applied to GAMMA-removal circuits 18 and provide linear color component signals R', G' and B'. The linear color component signals are low-pass filtered and applied to GAMMA correction circuits 5 to restore the GAMMA correction. Any harmonics introduced by GAMMA correction circuit 46 are removed by a further low-pass filtering operation. The color component signals R, G and B may be applied to encoding matrix 8 to provide luminance and chroma signals Y, CR, CB.

The apparatus shown in FIG. 4 is subject to the limitation that it only provides useful results when the bandwidth of the color component signals provided by source 10 is much greater than the desired bandwidth of the output luminance signal Y, for example when converting color component signals R, G, B that are suitable for driving a high resolution display to the composite NTSC (or other broadcast television) form. Of course, since a high resolution display typically has more than a thousand lines per frame, vertical filtering is necessary to reduce the number of lines in the component signals R, G, B to conform to the broadcast television standard. Applying the GAMMA correction to the linear color component signals R', G', B' alleviates the effect of reduced intensity when caused by vertical filtering as well as when it is caused by horizontal filtering.

The apparatus shown in FIG. 4 is subject to disadvantage in that the bandwidth of the luminance signal is no greater than that of the chroma signals. Thus, if the chroma signals are limited to a bandwidth of 1.2 MHz, high frequency luminance information is lost. On the other hand, if the bandwidth of the chroma signals is sufficient to preserve the high frequency luminance information, the chroma signals will need to be filtered in order to avoid distortion. Nevertheless, the apparatus shown in FIG. 4 provides results that are superior to those that are obtained by conventional means.

Figure 5:
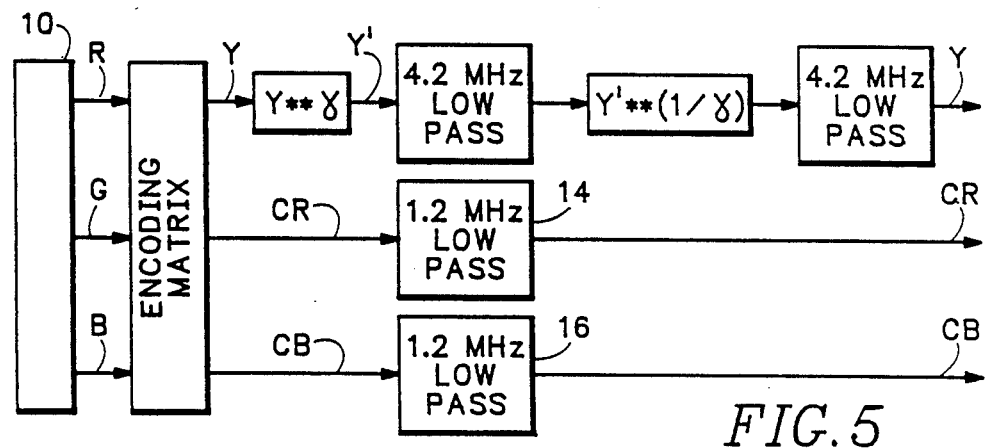
FIG. 5 is a block diagram of a fourth embodiment of the invention.

In the apparatus shown in FIG. 5, GAMMA-corrected color component signals R, G and B are applied to a matrix, which provides luminance and chroma output signals. The chroma signals CR and CB are processed in the manner described with reference to FIG. 2. The luminance signal Y is applied to a GAMMA-removal circuit which provides a linear luminance signal Y' equal to Y**GAMMA. The linear signal Y' is filtered and GAMMA correction is applied to filtered linear signal using an exponentiation circuit, which may be of conventional form.

As in the case of FIG. 4, the apparatus shown in FIG. 5 only provides useful results if the bandwidth of the color component signals provided by source 10 is much greater than the desired bandwidth of the output luminance signal. Moreover, in the case of the FIG. 5 apparatus the relationship $$Y = .299*(R**GAMMA) + .587*(G**GAMMA) + .114*(B**GAMMA)$$

only holds for zero chroma, and accordingly if the chroma is not zero, only an approximation to a true correction is provided.

It will be appreciated that the invention is not restricted to the particular embodiments that have been described, and that variations may be made therein without departing from the scope of the invention as defined in the appended claims and equivalents thereof. For example, although it is desirable that the final luminance signal Y provided by interpolator 40 be a ten-bit signal, to provide a sufficiently smooth change in luminance over a shaded surface, for example, it is not necessary that the signal Y be accurate to ten bits. Thus, the signal Yo might have only eight bits, and be accurate to eight bits, and the interpolator might then provide two additional bits of resolution.

We claim:

1. A method for processing a video signal in GAMMA-corrected color component form having a selected bandwidth, comprising removing the GAMMA correction to provide linear color component signals, limiting the bandwidth of the linear color component signals to a value less than the selected bandwidth to provide bandwidth-limited color component signals, and GAMMA correcting the bandwidth-limited component signals to provide GAMMA-corrected color component signals.

2. A method according the claim 1, further comprising limiting the bandwidth of the GAMMA-corrected color component signals.

3. A method according to claim 1, further comprising encoding the GAMMA-corrected, bandwidth-limited color component signals to provide luminance and chrominance component signals.

4. Apparatus for processing a video signal in GAMMA-corrected color component form having a selected bandwidth, comprising:
    means for removing the GAMMA correction to provide linear color component signals,
    means for limiting the bandwidth of the linear color component signals to a value less than the selected bandwidth to provide bandwidth-limited color component signals, and
    means for GAMMA correcting the bandwidth-limited component signals to provide GAMMA-corrected color component signals.

5. Apparatus according to claim 4, further comprising means for limiting the bandwidth of the GAMMA-corrected color component signals.

* * * * *